Dec. 23, 1930.                R. E. JACOBS                1,786,069
                          ELECTRIC MOTOR TRUCK
                       Filed Nov. 15, 1926      3 Sheets-Sheet 1
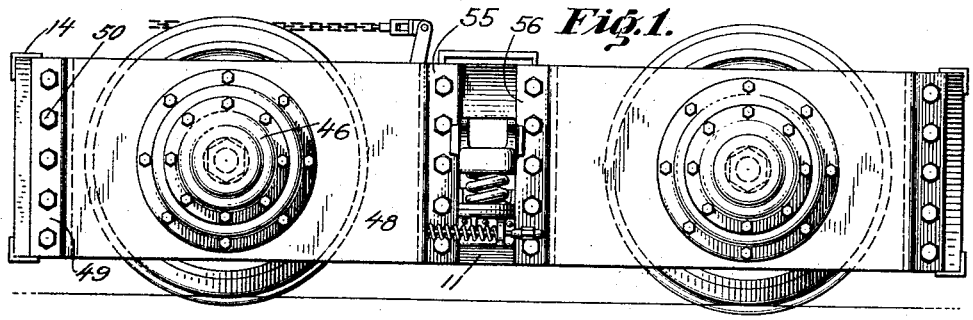
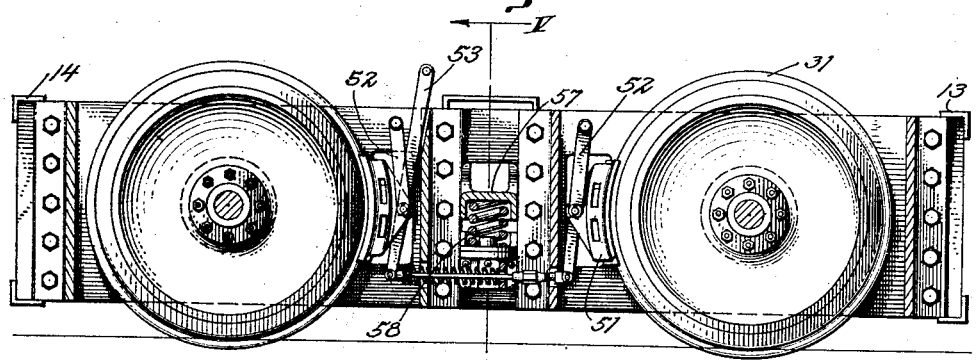
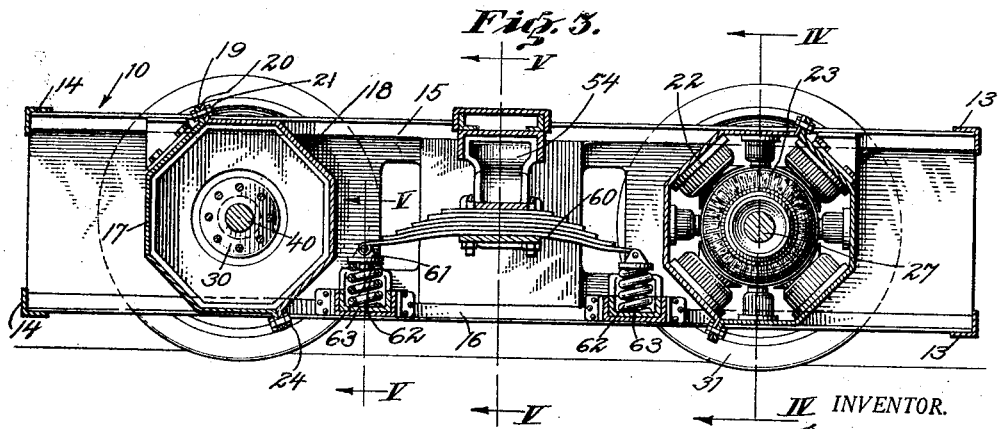
INVENTOR.
Reed E. Jacobs
BY
Townsend, Loftus & Abbett
ATTORNEYS.

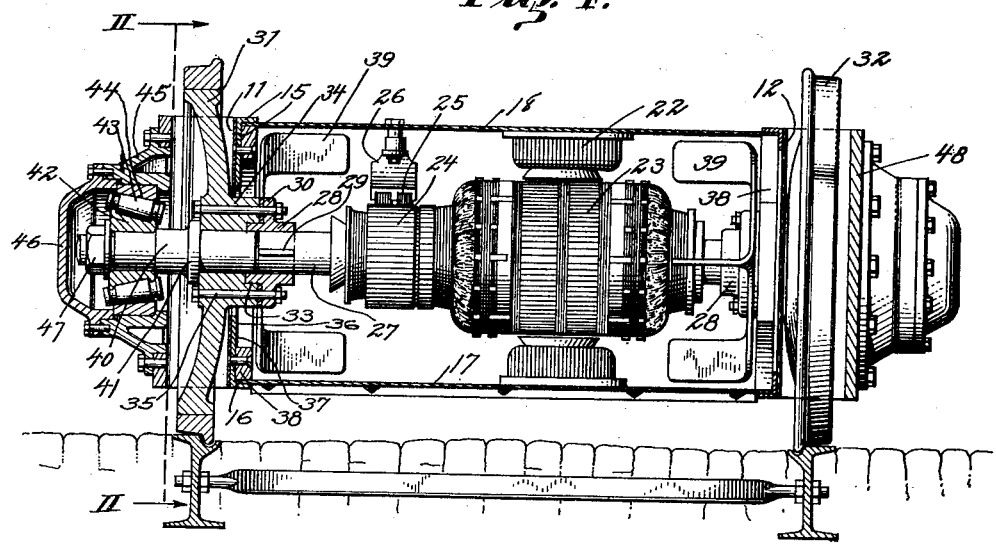
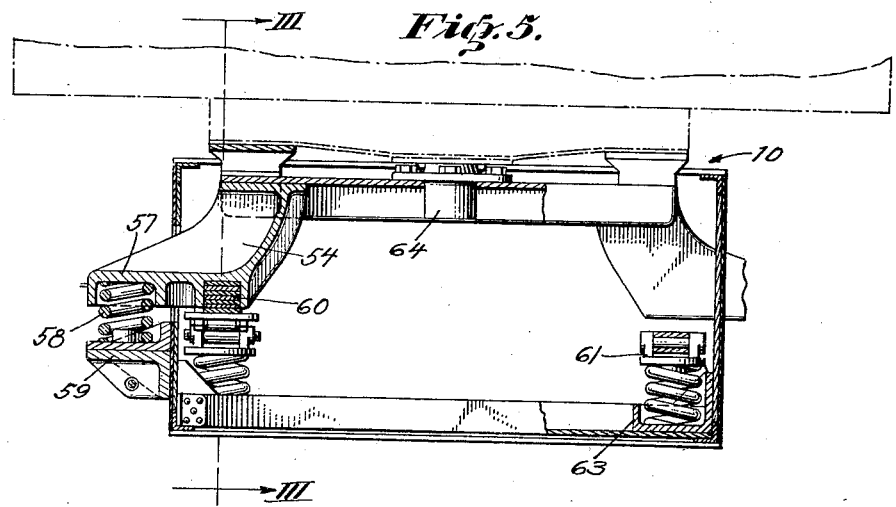
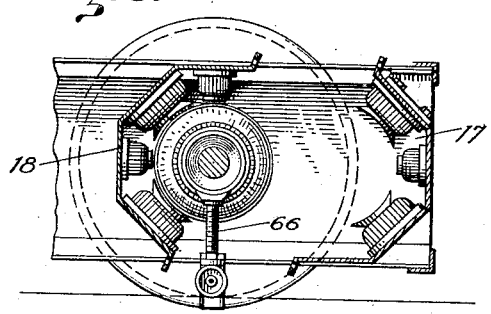

INVENTOR.
Reed E. Jacobs.
BY
Townsend, Loften & Attlee
ATTORNEYS.

Patented Dec. 23, 1930

1,786,069

UNITED STATES PATENT OFFICE

REED E. JACOBS, OF BERKELEY, CALIFORNIA

ELECTRIC MOTOR TRUCK

Application filed November 15, 1926. Serial No. 148,438.

This invention relates to improvements in electric motor trucks and is particularly concerned with the construction of a direct drive electric truck and the manner in which it may be mounted beneath a motor-driven vehicle such as an electric locomotive, street railroad car or gas electric bus.

It is the principal object of the present invention to provide an electric motor-driven truck having a relatively light but rigid frame structure in which is permanently incorporated the driving motors, thus making it impossible for the parts of the motor to be shifted or dislocated, the motor structure further making it possible for elevating means to be applied thereto in a manner to allow the driving coupling between the motor and the driving wheels to be readily disconnected and the motor cage opened without removal of the parts from the frame.

It is a further object of the invention to provide removable bearings for the axles so as to readily give free access to the wheels when they are to be repaired or removed.
Another object of the invention is the elimination of driving gears between the motor and the driving wheels and an arrangement whereby the dead weight of the truck is carried by the wheels and is not disposed upon the motor shaft.

The invention contemplates the use of a main frame suitably reinforced and formed with a plurality of spaced transversely extending tubes serving as motor tubes and within which the poles of motors may be secured, said tubes being made in sections whereby one section may be shifted to permit access to the rotor of the motor, the structure further embodying axles directly coupled to the opposite ends of the motor shaft and through which the wheels of the truck may be directly driven, said wheels being fitted with outwardly projecting stub shafts mounted within the exterior bearings carried by the frame.

The invention is illustrated by way of example in the accompanying drawings in which—

Figure 1 is a view in side elevation showing the truck with which the present invention is concerned.

Figure 2 is a view in longitudinal section through the truck, as seen on the lines 2—2 of Figure 4.

Figure 3 is a view in longitudinal section through the truck as seen on the line 3—3 of Figure 5.

Figure 4 is a view in transverse section through the motor structure as seen on the line 4—4 of Figure 3.

Figure 5 is a view in transverse section through the spring suspension structure, as seen on the line 5—5 of Figure 2 for the left hand side of the figure and on line 5—5 of Figure 3 for the right hand side of the figure.

Figure 6 is a small fragmentary view showing the manner in which the motor armature is supported when the motor cage is opened.

Figure 7:
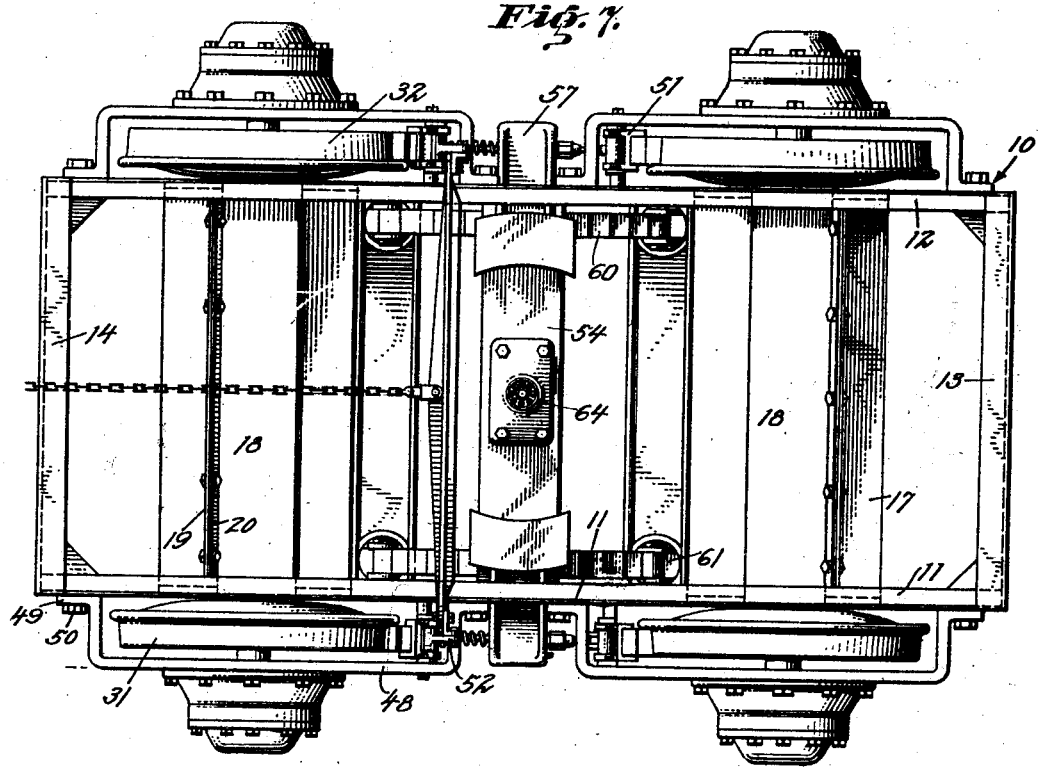
Figure 7 is a view in plan showing the complete truck structure.
Figure 8:
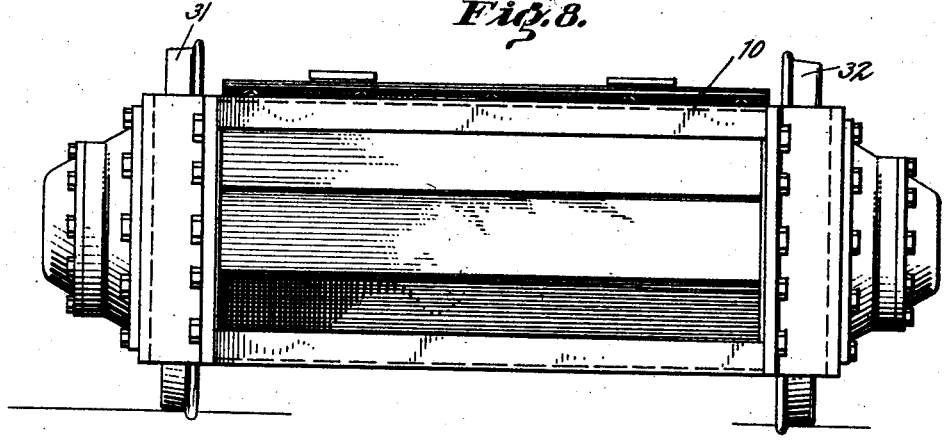
Figure 8 is a view in end elevation of the truck.

Referring more particularly to the drawings: 10 indicates a rectangular main frame. This frame comprises a pair of longitudinally extending side frame members 11 and 12 and transversely extending connecting frame members 13 and 14. These members are suitably tied together.

As more clearly seen in Figure 4 of the drawing, the side frame members are of relatively thin sheet metal reinforced along their longitudinal edges by angle bars 15 and 16. The end frame members, as shown in Figure 3 of the drawing, consist of transversely extending angle bars, which tie the side frame members together. These members are also tied together by sections of transversely extending tubes. These tubes, as particularly shown in Figures 3 and 6 of the drawing, are octagonal in shape and are formed in two halves indicated at 17 and 18. The halves 18 are rigidly secured between the side frame members 11 and 12 and to the reinforcing angle bars at the tops and bottoms of these frame members. The contiguous edges of the halves of the tubes along the line of parting are formed with bolting flanges 19 and 20 which receive bolts 21 by which the halves of the tubes may be securely held together and in their assembled position. The outer edges 17 of the tubes are adapted to move longitudinally of the side frame members and to slide upon the reinforcing angle members 15 and 16 of the side frames. This is indicated in Figure 6 of the drawing, where it will be seen that one of the tube halves 17 has been moved a considerable distance from the stationery half 18. This is for a purpose which will be hereinafter set forth.

The tubes, when in their assembled position, form a motor cage and a motor ring. This ring carries a plurality of suitably wound motor poles, 22. These poles are arranged in proper spaced relation to each other within the tubes and circumferentially thereof. Mounted within the tubes and suitably positioned with relation to the pole coils is a laminated armature core with its windings. The armature 23 thus formed is positioned to rotate between the poles and to operate in conjunction therewith as a motor. Mounted on one end of the armature is a commutator 24 against which suitable commutator brushes 25 contact. These brushes are supported on brackets 26 carried by the tubes. The armature and commutator structures thus formed are mounted on a motor shaft 27. Attention is directed, however, to the fact that the motor shaft does not extend beyond the side frame members of the main frame but terminates a distance considerably short thereof for purposes of assembly and repairs which will be hereinafter pointed out.

Carried upon the outer ends of the motor shaft are sleeves 28 which are slidably keyed onto the ends of the shaft by keys 29. These sleeves carry bolting flanges 30 by which the ends of the motor shaft are directly connected to the driving wheels 31 and 32 of the truck. The bolting flanges 30 are not formed directly upon the outer ends of the sleeves 28 but occur substantially midway the length of the sleeves, so that an outer cylindrical extension 33 will be provided. This extension extends into a counter bore in the hub 34 of the wheels of the vehicle. Coupling bolts 35 extend through openings in the hub of the wheels and also pass through openings in the bolting flanges 30 whereby the wheels are detachably secured in driving relation to the motor shaft. Attention is directed to the fact that the hubs of the wheels of the truck extend inwardly through openings 36 formed in the side frame members 11 and 12. These openings are suitably reinforced by filler plates 37 circumscribing the opening and an annular reinforcing ring or collar 38 securely fastened to the side frame member and the filler plates. Interposed between the inner ends of the wheel hubs and the bolting flanges 30 is the body portion of a cooling fan 39, the blades of which extend longitudinally within the motor tubes and tend to create a circulation of air which would cool the poles of the motor, as well as the armature and the brushes.

It is one of the important features of the present construction that the dead load of the truck will be taken off of the armature shaft and this is done by providing each of the wheels with an outwardly projecting stub shaft 40 which is fitted with a shoulder 41. These shafts are sweated into the poles of the wheels and project outwardly therefrom. The outer ends of the shafts are suitably turned to receive the inner recess 42 of anti-friction bearings such as the roller bearings 43 indicated in the drawings. The outer rings of these bearings 44 are suitably seated in a bearing cage 45 which circumscribes them. A dust cap 46 is secured upon the outer end of the cage to to enclose and protect the bearings. The bearings are held upon the stub shaft by suitable nuts 47. The bearing cages are directly bolted to outer journal brackets 48. These brackets are channel shaped in horizontal section and are fitted with bolting flanges 49 to receive bolts 50 by which they are directly secured to the side frame members 11 and 12 of the trucks. The dimensions of the brackets are such as to cause them to span the wheels and to form a rectangular space between the frame and the brackets occupied by the wheels, as clearly shown in Figure 7. It will be evident that these brackets add rigidity to the frame structure and at the same time provide means whereby the weight of the frame may be directly carried upon the wheels.

It is to be understood that while the structure here disclosed is provided with wheels suitable for use upon street car railway tracks, it is also possible to employ the same construction in connection with motor vehicles in which an electrically driven truck is provided.

Referring more particularly to Figure 2, it will be seen that the wheels here shown are fitted with brake shoes 51. These shoes are suitably operated by brake levers 52 and a main brake operating arm 53. The truck thus constructed is mounted beneath a vehicle body such as an electric car or bus. This mounting consists of a transversely extending bolster 54 secured between the frame members 11 and 12 and extending parallel to and substantially midway between the motor tubes, which consist of the halves 17 and 18. The bolsters project through the frame members and are positioned between reinforcing guides 55 and 56. The outer ends of the bolsters are fitted with spring seats 57 adapted to receive cushion springs 58. The lower ends of these springs are seated upon spring seats 59 supported upon the outer ends of the frames, as more clearly shown in Figure 5.

The bolsters also carry semi-elliptic leaf springs 60 disposed on the inside of the side frame members 11 and 12. These springs extend longitudinally of the frame and are pivotally secured at their opposite ends to spring seats 61 resting upon helical springs 62 carried in suitable spring seats 63 secured to the inner faces of the side frame members 11 and 12, and near the lower edge thereof. It will be realized that the semi-elliptical springs will act as resilient equalizer bars. The bolster also carries a central bearing 64 to receive a king bolt. By this arrangement of spring suspension, it will be evident that the truck will resiliently support the vehicle body upon a resilient equalizer spring 60 and that additional resiliency will be obtained from the helical spring 62. It will also be apparent that under excessive load springs, when the equalizer bar 60 has been flexed to a critical point, the central helical springs 58 will co-operate therewith in carrying the load.

In operation of the present invention, the main truck frame 10 is assembled as shown at Figure 7 of the drawing and the stationary halves 18 of the motor tubes are rigidly secured in position, while the movable halves 17 are slidably secured between the frame members 11 and 12.

Attention is directed to the fact that the line of parting between the halves of the motor tube is not in a vertical plane, but at an angle to the vertical so that when the lower bolting flanges are separated there is considerable clearance beneath the armature structure of the motor to permit the introduction of suitable supporting means, as for example, a jack as shown in Figure 6 and indicated at 66. After the truck has been assembled and the stationary portions of the tubes fastened in place, it is then necessary to position the armature within the frame, and this is done by suitably supporting it upon jacks 66. Attention is directed to the fact that the overall length of the armature shaft is less than the inside width of the frame 10, and that the ends terminate short of the inner faces of the wheel hubs so that the armature shaft may be dropped in the event that it is desired to remove the armature for any cause without dismantling the entire truck. The armature shaft as supported on support 66 may then be coupled to the hubs of wheels 31 and 32. It will be understood, of course, that the wheels have been previously mounted in position within the supporting brackets 48 and are secured by their stub axles 40 which are held in the bearing structures enclosed within the cages 45. When the armature is moved up into longitudinal alignment with the stub axles, the collars 28 may be slipped into position with their forward projections 33 in the recesses in the counter bores of the hubs of the wheels.

The sleeve flanges 30 may then be firmly bolted to the inner faces of the hubs by the bolts 35. After this has been done, the supports may be removed from beneath the armature and the movable halves 17 of the motor tubes It is then possible to pass the bolts 21 through the flanges of the tube halves and to cause the assembled tubes to form a suitable motor ring and to properly support the motor poles in position for electrical operation.

It will thus be seen that by the arrangement here disclosed, a direct drive electric motor truck is provided, which truck embodies means whereby the load of the truck is not imposed upon the shafts of the driving armature, and that it is possible to readily assemble, replace and repair the parts without entirely dismantling the truck, and it is further obvious that the present invention provides novel spring supporting means for a truck.

While I have shown the preferred form of my invention as now known to me, it will be understood that various changes might be made in the combination, construction and arrangement of parts by those skilled in the art without departing from the spirit of the invention as claimed.

Having thus described my invention, what I claim and desire to secure by Letters Patent is—

1. An electric motor truck, comprising a main frame, wheels constituting a running gear for said truck, said wheels being independently mounted upon the outer sides of the main frame, separable motor structures interposed between complementary wheels, and means for coupling the motor structures between said complementary wheels to produce driving rotation thereof.

2. An electric motor truck, comprising a rectangular main frame, complementary wheels disposed in pairs along the opposite sides of said main frame and mounted for independent rotation, a separable motor housing carried between the side frame members of the main frame and adapted to receive a motor armature, and means whereby said armature may be disposed between complementary wheels upon opposite sides of the main frame and may be coupled in driving relation thereto.

3. An electric motor truck, comprising a rectangular main frame, wheels positioned along the opposite outer sides of said main frame and having outwardly projecting stub axles, bearings supported from the outer sides of the main frame and receiving the outer projecting stub axles whereby the main frame will be carried thereon, motor housings extending transversely of the main frame and secured thereto, an armature within said housing, an armature shaft therefor, said shaft being of a length to extend between the wheels when in longitudinal alignment with the stub shafts of complementary wheels, and coupling means to secure said armature shaft in longitudinal alignment with the wheels and in driving connection therewith.

4. An electric motor truck, comprising a rectangular main frame, a plurality of parallel transversely extending motor housing tubes connecting the opposite side members of said main frame, a motor armature positioned one within each of said tubes, traction wheels disposed on the outside of said main frame having their shafts in alignment with the motor housing tubes, and couplings between the ends of the motor armature and the traction wheels.

5. In an electric motor truck, a rectangular main frame comprising parallel side frame members, transversely extending end frame members securing the side frame members in fixed relation to each other, motor tubes extending transversely of the frame and being formed in two separable halves—one-half of each tube being rigidly secured by its opposite ends to the side frame members.

6. In an electric motor truck, a rectangular main frame comprising parallel side frame members, transversely extending end frame members securing the side frame members in fixed relation to each other, motor tubes extending transversely of the frame and being formed in two separable halves—one-half of each tube being rigidly secured by its opposite ends to the side frame members, the other half of each tube being slidably mounted upon the main frame.

7. In an electric motor truck, a rectangular main frame comprising parallel side frame members, transversely extending end frame members securing the side frame members in fixed relation to each other, motor tubes extending transversely of the frame and being formed in two separable halves—one-half of each tube being rigidly secured by its opposite ends to the side frame members, the other half of each tube being slidably mounted upon the main frame, motor pole pieces secured within the halves of each of said tubes, and motor armature rotatably supported within the tubes.

8. In an electric motor truck, a rectangular main frame comprising parallel side frame members, transversely extending end frame members securing the side frame members in fixed relation to each other, motor tubes extending transversely of the frame and being formed in two separable halves—one-half of each tube being rigidly secured by its opposite ends to the side frame members, the other half of each tube being slidably mounted upon the main frame, motor pole pieces secured within the halves of each of said tubes, and motor armature rotatably supported within the tubes, said side frame members being formed with openings extending into the tubes or communicating with the tubes, traction wheels disposed on the outside of the side frame members and having hubs projecting through the openings, and into the tubes, an armature positioned within the tube and with its axis in longitudinal alignment with the axes of the wheels, field coils disposed around the armature and secured within the halves of the tubes, and means for coupling the ends of the armature shaft to the inner faces of the tubes.

9. In an electric motor truck, a rectangular main frame comprising parallel side frame members, transversely extending end frame members, wheels disposed along the opposite outer sides of the side frame members, stub axles projecting outwardly from said wheels, bearings receiving the axles, and brackets supporting the bearings from the main frame.

10. In an electric motor truck, a rectangular main frame comprising parallel side frame members, transversely extending end frame members, wheels disposed along the opposite outer sides of the side frame members, stub axles projecting outwardly from said wheels, bearings receiving the axles, and brackets supporting the bearings from the main frame, a motor armature having a shaft of a length adapted to span the distance between the inner faces of a pair of wheels carried by the frame, means for coupling the ends of the armature shaft to the hubs of the wheels and in longitudinal alignment therewith, and a housing enclosing the armature and supporting field coils therearound, said housing being secured by its opposite ends to the side frame members of the frame.

11. In an electric motor truck, a frame formed of parallel side plates of relatively thin material, reinforcing members extending along the upper and lower marginal edges of said side plates, transversely extending members securing the side frame plates in fixed relation to each other, said plates being formed with holes through them, the holes in opposite side plates being in register, and reinforcing members circumscribing said holes and being secured to the side plates.

12. In an electric motor truck, a frame formed of parallel side plates of relatively thin material, reinforcing members extending along the upper and lower marginal edges of said side plates, transversely extending members securing the side frame plates in fixed relation to each other, said plates being formed with holes through them, the holes in opposite side plates being in register, and reinforcing members circumscribing said holes and being secured to the side plates, and motor housing tubes extending transversely of the frame and being adapted to register with the holes in the side plates, said motor housing tubes being formed in two longitudinally separable halves.

13. In an electric motor truck, a frame formed of parallel side plates of relatively thin material, reinforcing members extending along the upper and lower marginal edges of said side plates, transversely extending members securing the side frame plates in fixed relation to each other, said plates being formed with holes through them, the holes in opposite side plates being in register, and reinforcing members circumscribing said holes and being secured to the side plates, and motor housing tubes extending transversely of the frame and being adapted to register with the holes in the said plates, said motor housing tubes being formed in two longitudinally separable halves, one-half of each of said tubes being rigidly secured by its ends to the side plates and the other half being detachably secured to the fixed half.

14. In an electric motor truck, a frame formed of parallel side plates of relatively thin material, reinforcing members extending along the upper and lower marginal edges of said side plates, transversely extending members securing the side frame plates in fixed relation to each other, said plates being formed with holes through them, the holes in opposite side plates being in register, and reinforcing members circumscribing said holes and being secured to the side plates, and motor housing tubes extending transversely of the frame and being adapted to register with the holes in the said plates, said motor housing tubes being formed in two longitudinally separable halves, one-half of each of said tubes being rigidly secured by its ends to the side plates and the other half being detachably secured to the fixed half, said second half being slidably mounted upon the main frame.

15. In an electric motor truck, a frame formed of parallel side plates of relatively thin material, reinforcing members extending along the upper and lower marginal edges of said side plates, transversely extending members securing the side frame plates in fixed relation to each other, said plates being formed with holes through them, the holes in opposite side plates being in register, and reinforcing members circumscribing said holes and being secured to the side plates, and motor housing tubes extending transversely of the frame and being adapted to register with the holes in the said plates, said motor housing tubes being formed in two longitudinally separable halves, one-half of each of said tubes being rigidly secured by its ends to the side plates and the other half being detachably secured to the fixed half, said second half being slidably mounted upon the main frame, field windings carried by the complementary halves of each motor housing tube, an armature adapted to be positioned within the tube and having a shaft of a length slightly less than the distance between the side plates of the frame, traction wheels disposed along opposite sides of the frame and having hubs projecting inwardly through the openings in the side plates, and means for coupling the hubs of said traction wheels to the ends of the armature and in longitudinal alignment therewith.

16. In an electric motor truck, a frame formed of parallel side plates of relatively thin material, reinforcing members extending along the upper and lower marginal edges of said side plates, transversely extending members securing the side frame plates in fixed relation to each other, said plates being formed with holes through them, the holes in opposite side plates being in register, and reinforcing members circumscribing said holes and being secured to the side plates, and motor housing tubes extending transversely of the frame and being adapted to register with the holes in the said plates, said motor housing tubes being formed in two longitudinally separable halves, one-half of each of said tubes being rigidly secured by its ends to the side plates and the other half being detachably secured to the fixed half, said second half being slidably mounted upon the main frame, field windings carried by the complementary halves of each motor housing tube, an armature adapted to be positioned within the tube and having a shaft of a length slightly less than the distance between the side plates of the frame, traction wheels disposed along opposite sides of the frame and having hubs projecting inwardly through the openings in the side plates, and means for coupling the hubs of said traction wheels to the ends of the armature and in longitudinal alignment therewith, stub axles extending outwardly from each of the traction wheels and carried thereby, bearing members receiving the outwardly projecting ends of said axles, and brackets for supporting said bearing members on the main frame.

17. In an electric motor truck, a driving unit comprising traction wheels, an intermediate armature shaft in longitudinal alignment with the axes of said traction wheels and spanning the distance therebetween, coupling members slidably mounted upon the armature shaft and keyed thereto whereby the armature shaft may be withdrawn from its position between the wheels without molesting the wheels, and means for fastening said members to the wheels.

18. In a truck structure, a main frame along the outer opposite sides of which truck wheels are disposed, supplementary frame members secured along the opposite sides of said frame, said supplementary frame members carrying bearings to receive the wheel axles and spanning the wheels in a manner to reenforce the main frame.

19. In an electric motor driven truck, a main frame, traction wheels therefor, stub axles extending outwardly from each of said traction wheels, bearing members on the frame and rotatably supporting the outer ends of the stub axles, and armature shafts of a length less than the width of the main frame detachably connected to stub axles and aligning therewith.

REED E. JACOBS.